C. T. WESTLAKE.
SIX WHEEL CAR TRUCK BRAKE.
APPLICATION FILED APR. 21, 1914.
1,107,639.
Patented Aug. 18, 1914.
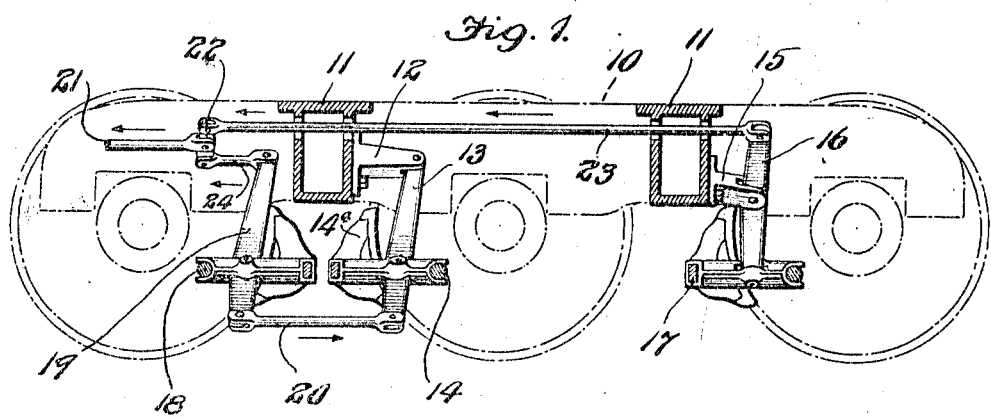
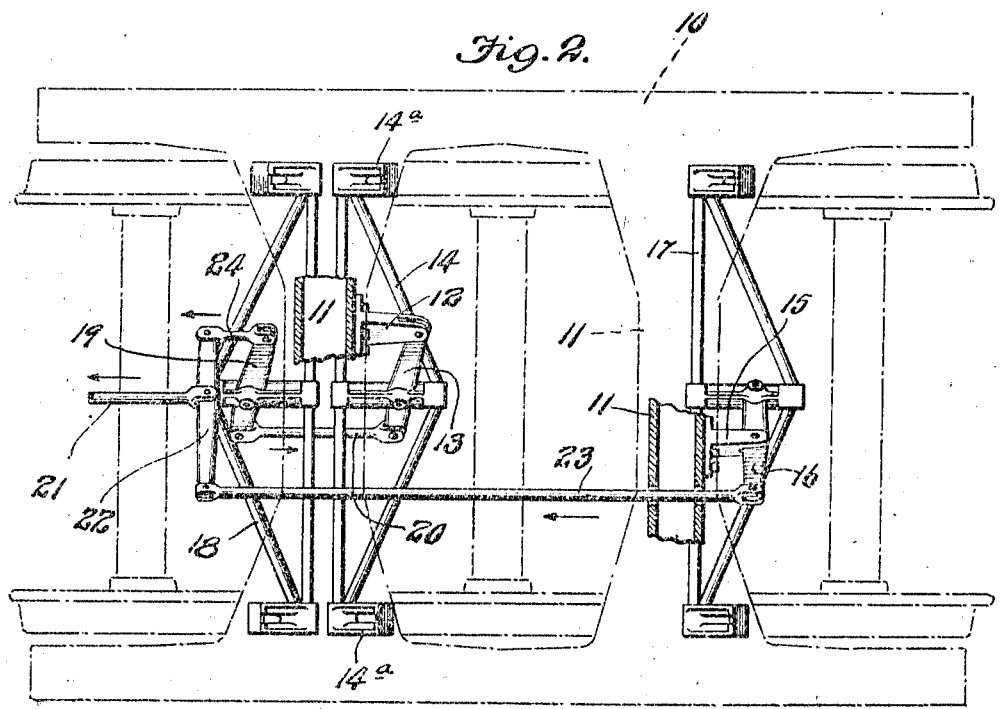
Inventor,
Charles T. Westlake,

UNITED STATES PATENT OFFICE.

CHARLES T. WESTLAKE, OF ST. LOUIS, MISSOURI, ASSIGNOR TO COMMONWEALTH STEEL COMPANY, OF ST. LOUIS, MISSOURI, A CORPORATION OF NEW JERSEY.

SIX-WHEEL-CAR-TRUCK BRAKE.

1,107,639.

Specification of Letters Patent.  Patented Aug. 18, 1914.

Application filed April 21, 1914. Serial No. 833,447.

*To all whom it may concern:*

Be it known that I, CHARLES T. WESTLAKE, a citizen of the United States, residing at St. Louis, Missouri, have invented a certain new and useful Improvement in Six-Wheel-Car-Truck Brakes, of which the following is a full, clear, and exact description, such as will enable others skilled in the art to which it appertains to make and use the same, reference being had to the accompanying drawings, forming part of this specification, in which—

Figure 1 is a side elevational view of my improved brake rigging with parts of the brake beams shown in section. Fig. 2 is a plan view of the brake rigging.

My invention relates to new and useful improvements in brake rigging for six wheel car trucks, the principal object of my invention being to provide a simple and efficient brake mechanism, having comparatively few parts, and which mechanism is of the inside hung type.

A further object of my invention is to provide a simple form of six wheel brake mechanism which, while capable of being utilized on various forms of six wheel trucks, is particularly adapted for use in connection with six wheel trucks having frames of the type shown in Patent No. 1,068,529, issued July 29, 1913.

With the above and other objects in view, my invention consists in certain novel features of construction and arrangement of parts, hereinafter more fully described and claimed.

In the drawings I have illustrated in dotted lines a six wheel truck having a one piece frame similar to the frame disclosed in the patent above mentioned, and which frame comprises wheel pieces 10 and transoms 11. Formed integral with or fixed to one of the transoms is a bracket 12 and pivotally connected thereto is one end or extremity of a brake lever 13. Pivotally connected to this lever at a suitable point between its extremities is the center brake beam 14, the shoes 14ᵃ of which are adapted to engage the peripheries of the wheels on the center axle of the truck. Formed on or fixed to the other transom is a bracket 15 to which is pivotally connected a brake lever 16. The pivot point of this lever is at a suitable point between its extremities and pivotally connected to one of the extremities of said lever is a brake beam 17. This beam is "inside hung," that is, it is arranged so that its shoes engage the inner portions of the peripheries of the corresponding wheels. A inside hung beam 18 is arranged so that its shoes engage the inner portions of the wheels at the opposite end of the truck, and pivotally connected to a part of this brake beam, preferably the strut thereof, is a floating lever 19. The pivot point of this lever is at a point intermediate its ends, and pivotally connected to said lever, preferably at a point below the point of pivotal connection with the brake beam 18, is one end of a compression member, preferably a rod 20. The opposite end of this compression member is pivotally connected to the lever 13 at a point below the point of pivotal connection between said lever and the brake beam 14.

The tension member 21 which is associated with the brake actuating mechanism carried by the car body is pivotally connected to an equalizing lever 22, and pivotally connected to this equalizing lever is one end of a tension member 23, preferably a rod, the opposite end of which is pivotally connected to the lever 16. One end of a short tension member 24 is pivotally connected to the equalizing lever 22 and the opposite end of said tension member is pivotally connected to floating lever 19.

The operation of my improved brake will be readily understood from an inspection of the drawings wherein arrows indicate the direction of movement of the parts 20, 23, 24 and 21 when the latter is actuated to set the brakes. When rod 21 is actuated the levers 13, 16 and 19 will swing upon their fulcrums, and simultaneously all the brake beams will be moved so as to bring the brake shoes into engagement with the peripheries of the wheels.

A six wheel brake of my improved construction is composed of but few parts, can be readily assembled and combined with six wheel trucks, particularly those wherein one piece truck frames are utilized, and said brake possesses superior advantages in point of simplicity, durability, and general efficiency.

It will be readily understood that minor changes in the size, form and construction of the various parts of my improved brake can be made and substituted for those herein shown and described, without departing from the spirit of my invention, the scope of which is set forth in the appended claims.

I claim:

1. In a brake for six wheel trucks, a lever fulcrumed at one of its extremities to a convenient part of the truck, a brake beam pivotally connected to said lever at a point between its extremities, a second lever fulcrumed at a point between its extremities to a convenient part of the truck, a brake beam pivotally connected to one of the extremities of said second lever, a floating lever, a brake beam pivotally connected to said floating lever at a point between its extremities, a compression member connecting one of the extremities of said floating lever with the corresponding extremity of the first mentioned lever, tension members pivotally connected to corresponding extremities of the second lever and the floating lever, an equalizing lever connecting said tension members, and means for actuating said equalizing lever and the parts corresponding therewith.

2. In a brake for six wheel trucks, a dead lever fulcrumed at one of its extremities to a convenient part of the truck, a brake beam pivotally connected to said lever between its extremities, a compression member pivotally connected at one end to the other extremity of said lever, a second dead lever fulcrumed at a point between its extremities to a convenient part of the truck, a brake beam pivotally connected to said second lever at one of its extremities, a tension member pivotally connected to the other extremity of said second dead lever, a floating lever to one extremity of which the compression member is connected, a brake beam pivotally connected to said floating lever at a point between its extremities, a second tension rod pivotally connected to said floating lever, an equalizing lever connecting the corresponding ends of the tension members, and means for imparting simultaneous and corresponding movement to the tension members.

3. The combination with a six wheel truck and its inside hung brake beams, of a lever pivotally connected to the center beam, which lever is fulcrumed to a fixed part of the truck, a second lever fulcrumed at a point between its extremities to a convenient part of the truck frame, which second lever is pivotally connected to one of the brake beams, a floating lever pivotally connected to the third brake beam, a compression member connecting corresponding extremities of the floating lever and first mentioned lever, and means connecting the corresponding extremities of the floating lever and second lever for imparting simultaneous and corresponding movement thereto.

In testimony whereof I hereunto affix my signature in the presence of two witnesses, this 23rd day of March, 1914.

CHARLES T. WESTLAKE.

Witnesses:
HAL C. BELLVILLE,
B. E. KUHL.